United States Patent [19]

Vollmer

[11] 4,235,013
[45] Nov. 25, 1980

[54] TUBE GUIDE-EXPANDER

[75] Inventor: Regis R. Vollmer, Penn Township, Berks County, Pa.

[73] Assignee: Westinghouse Electric Corp., Pittsburgh, Pa.

[21] Appl. No.: 955,688

[22] Filed: Oct. 30, 1978

[51] Int. Cl.² .......................................... B21D 39/06
[52] U.S. Cl. .................................... 29/727; 29/523; 72/58
[58] Field of Search ................. 29/726, 727, 157.3 C, 29/252, 258, 263, 507, 523, 283.5; 72/58, 465

[56] References Cited

U.S. PATENT DOCUMENTS

| | | | |
|---|---|---|---|
| 3,049,358 | 8/1962 | Polos | 29/252 |
| 3,152,630 | 10/1964 | Nilsson | 29/523 |
| 3,432,916 | 3/1969 | Fisher et al. | 29/523 |
| 3,542,076 | 11/1970 | Richardson | 72/58 |
| 3,595,047 | 7/1971 | Fanning | 29/523 |
| 3,662,451 | 5/1972 | Wagner | 29/263 |
| 4,006,619 | 2/1977 | Anderson | 72/58 |
| 4,068,372 | 1/1978 | Kamohara | 29/727 |
| 4,142,581 | 3/1979 | Yoshitomi | 29/523 |

*Primary Examiner*—Lowell A. Larson
*Attorney, Agent, or Firm*—J. W. Keen

[57] ABSTRACT

A tube guide-expander for guiding heat exchanger tubes through tube sheet apertures from a secondary to a primary side thereof and expanding those tubes into contact with the apertures' walls. The guide-expander includes relatively axially displaceable first and second compression structures and elastomeric O-rings which radially expand into contact with the tube's inner surface when axially compressed between the compression structures. The first compression structure is abuttable with the tube's end and has an axial opening therethrough. The second compression structure constitutes an elongated element which extends through the opening and has a ram element connected to the end inside the tube and a driving element connected to the end outside the tube. The ram and elongated elements are preferably threadably engaged so as to permit relative axial displacement therebetween when they are relatively rotated. Such relative axial displacement maintains selected degrees of axial compression on the radially expansible O-rings and provides releasable retention of the guide-expanders in the tubes during guidance of the tubes through the tube sheet apertures.

10 Claims, 17 Drawing Figures

TUBE GUIDE-EXPANDER

CROSS-REFERENCE TO RELATED APPLICATION

The present invention is related to commonly assigned, copending applications Ser. No. 965,016 and Ser. No. 951,927, whose respective filing dates are Nov. 30, 1978 and Oct. 16, 1978.

BACKGROUND OF THE INVENTION

1. Field of the Invention

This invention relates to retubing shell and tube heat exchangers, such as nuclear steam generators, and more particularly, to a dual duty tube guide and tube expander apparatus which is tapered to facilitate tube insertion and is compatible with a tool which engages the apparatus, actuates the apparatus's tube expansion feature, and extracts the apparatus from the tube.

2. Description of the Prior Art

Tapered tube guides, releasably retained in the leading end of heat exchanger tubes for guiding those tubes through aligned apertures in spatially separated support plates and ultimately into proper position within tube sheet apertures are well known in the art. Conical nosed tube guides were, according to the prior art, removed upon proper tube-to-tube sheet positioning so as to permit a subsequent tube-to-tube sheet connection. Such connections are customarily obtained by roll-expanding or welding the tube to the tube sheet. However, even in the case of welding, the tube is often "tack-rolled" into place in preparation for the final seal welding of the tube-to-tube sheet.

Conical nosed tube guides having bristles projecting from a central stem in a spiral configuration and an apparatus for extracting those tube guides from tubes in which those guides are releasably retained are specifically described in commonly assigned, copending application Ser. No. 898,348 filed Apr. 21, 1978. While removal of such tube guides from the tubes would normally be performed manually by workmen from the inside of a channel head on the primary side of the tube sheet, in the case of a shell and tube heat exchanger which has been exposed to a hazardous environment such as the radioactivity found in a nuclear steam generator, it is desirable to effect any repair or replacement operation thereto through remotely operated mechanisms to minimize exposure of workmen to the radioactivity.

The aforementioned copending actuator-extraction apparatus cooperates with a support-positioning apparatus described in commonly assigned copending patent application Ser. No. 888,701 filed Mar. 21, 1978. Such support positioning apparatus is designed to operate within a steam generator's channel head while being controlled from a remote location which is suitably shielded from the channel head's radioactive environment. While the apparatus described in Ser. No. 898,348 permits automated, remote extraction of tube guides, it is desirable to have a tube guide and extraction tool for use therewith that will not only automatically extract the guides from the tubes and release them upon their extraction, but also expand or tack-roll the tube into contact with the tube sheet's aperture in preparation for the subsequent seal weld therebetween.

SUMMARY OF THE INVENTION

In accordance with the present invention a tube guide-expander apparatus is provided for guiding a tube through generally aligned apertures in spacially separated tube supports and a tube sheet and expanding the tube into contact with the tube sheet aperture's wall prior to its extraction from the tube preparatory to final tube rolling or seal welding. The guide-expander is releasably retained within the tube end by axially compressible radial expansion means which respond to axial compression by expanding in the radial direction. The expansion means is subjected to a predetermined extent of axial compression sufficient to frictionally engageably retain the guide-expander within the tube, but less than that required to radially expand the tube into contact with the tube sheet aperture wall.

The guide-expander apparatus generally comprises a first compression structure having an opening therethrough which is radially bounded by a tube thrust portion which is axially abuttable with the tube's open end, a second compression structure axially displaceable relative to the first compression structure and having ram and driving elements situated on opposite ends of an elongated element extending through the opening, expansion means arranged axially between the ram element and thrust portion for radially expanding a portion of the enclosing tube in response to an axial compression thereof, and means for maintaining axial compression on the radial expansion means. The driving element includes a tip portion having an inwardly tapered periphery in a direction away from the tube end and a stem portion situated axially adjacent thereto and having a smaller radial extension. The ram and driving elements radially extend beyond the first compression structure's opening to provide axial displacement limits for the second compression structure relative to the first compression structure. The first compression structure preferably includes a sleeve portion which extends into the tube and provides inner radial support for the radial expansion means which preferably constitute a plurality of axially adjacent elastomeric O-rings. The preferred embodiment of the first compression structure further includes a transition positioning portion whose outer surface radially diverges in an axial direction away from the tube so as to facilitate concentric, coaxial assembly of the sleeve and opening in the tube.

Selectively releasable retention of the guide-expander within the tube during the tube's insertion through the apertures is provided by compression maintaining means which maintain compression on the expansion means. Compression maintaining means preferably include means for relatively axially displacing the enlongated element and at least one of the elements connected thereto. The preferable axial displacement means constitutes engageable threads formed on the elements to be relatively axially displaced. Suitable relative angular rotation of such threaded elements causes the ram to advance toward the tube thrust portion and compress the radial expansion means into contact with the tube's inner surface. The desired extent of O-ring radial expansion which frictionally resists axial extraction and ensures retention of the guide-expander within the tube during insertion of the tube is provided by relatively rotating the elements through an angular displacement corresponding to the desired radial expansion. After properly positioning the tube within the tube sheet aperture, the tube is expanded and the guide-expander is extracted therefrom. Tube expansion may be obtained by further rotating the elongated element relative to at least one of its attached elements or preferably by axially displacing the second compression structure relative to the first compression structure.

Since tube expansion results in radial enlargement of the tube's inside and outside surfaces, reversal of the guide-expander's aforementioned relative rotation or axial displacement provides contraction of the radial expansion means to its former releasable retention size and facilitates extraction of the guide-expander from the tube.

BRIEF DESCRIPTION OF THE DRAWINGS

The objects and advantages of this invention will become more apparent from the following detailed description in connection with the accompanying drawings, in which.

DESCRIPTION OF THE PREFERRED EMBODIMENT

Figure 1A:
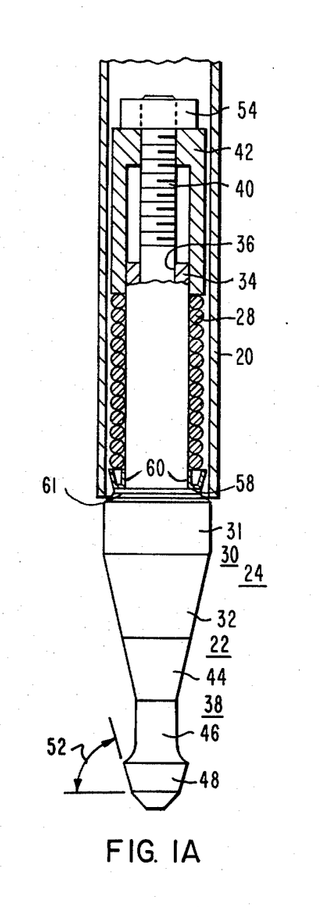
FIGS. 1A and 1B are partial sectional views of a tube guide-expander respectively inserted in and secured against the inner surface of a tube.

Referring now to the drawings in detail, FIG. 1A shows a partial sectional view of a tube 20 with a tube guide-expander 22 inserted in an open end thereof. Tube guide-expander 22 has first and second compression structures 24 and 26 and radial expansion means such as the illustrated elastomeric O-rings 28 axially disposed between portions of both compression structures. First compression structure 24 includes a tube thrust portion 30 which constitutes abutting and tapered components 31 and 32, respectively. Sleeve portion 34 is preferably attached to thrust portion 30 and is insertable within tube 20 so as to provide radially inner support for O-rings 28. Opening 36 extends axially through and is radially bounded by sleeve portion 34 and thrust portion 30. The second compression structure 26 includes driving element 38, elongated element 40 and ram element 42. Driving element 38 constitutes a tapered portion 44, a stem portion 46, and a tip portion 48. Elongated element 40 extends through the first compression structure's opening 36 and is connected to the driving and ram elements 38 and 42 respectively on its opposite ends. The outer periphery of tapered portion 44 cooperates with the outer periphery of tapered component 32 in providing a smooth transitition surface of decreasing diameter in a direction from the tube thrust portion 30 to stem portion 46. Tip portion 48 preferably includes at least two taper angles 50 and 52 which are, by example, 15 degrees and 45 degrees respectively as measured from the horizontal. Trailing angle 52 is greater than leading angle 50 so as to minimize the material needed in tip portion 48 and improve guidance over a tip portion having only a single taper angle.

Figure 3:
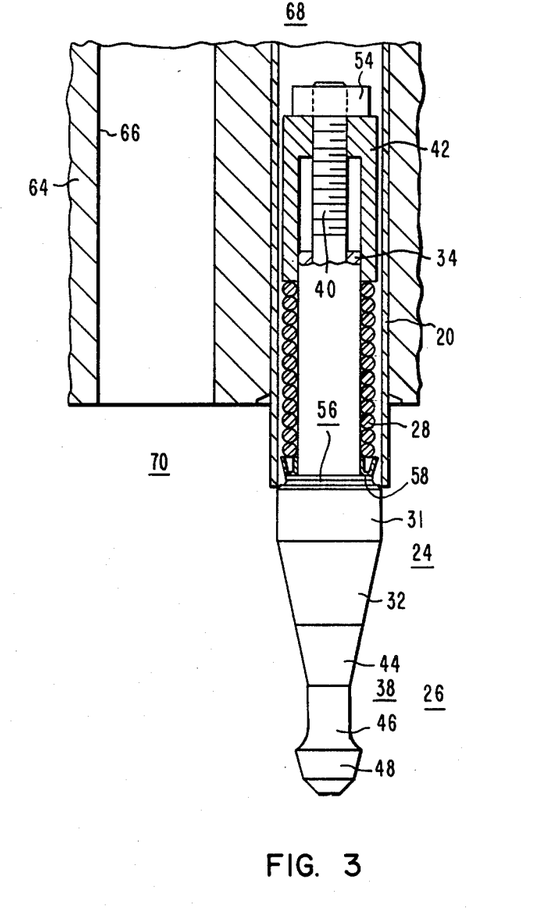
FIG. 3 is a partial sectional view of the guide-expander and attached tube inserted through a heat exchanger tube sheet.

Ram element 42 is preferably disposed in threaded engagement with elongated element 40 so as to be axially displaceable relative thereto when relatively rotated. Frictional axial engagement of ram 42 with O-rings 28 restrains ram rotation during rotation of driving element 38 and connected elongated element 40 and provides such relative axial displacement. Radial expansion means such as O-rings 28 respond to such axial displacement induced compression by radially expanding (as shown in FIG. 3) into contact with tube 20's inside surface. Stopping structure 54 prevents threaded disengagement between ram and elongated elements 42 and 40, respectively, and preferably constitutes a nut in threaded engagement with elongated element 40. A spring pin (not shown) or other device is preferably radially inserted into elongated element 40 and nut 54 to prevent relative rotation therebetween. Transition portion 56 of first compression structure 24 extends radially beyond sleeve portion 34 to form an axially supportive platform 58 for seals 60 which prevent axial flow of elastomeric O-rings 28 therebeyond and optimize their radial expansion during axial compression thereof. The radially outer periphery of transitition portion 56 tapers outwardly from the seal support platform 58 to the tube thrust portion 30. The radially outward taper of transition portion 56 constitutes a positioning surface 61 preferably in the configuration of one of more radii and facilitates coaxial assembly of O-rings 28 within tube 20 and axial abutment of thrust portion 30 against the end of tube 20.

Figure 1B:
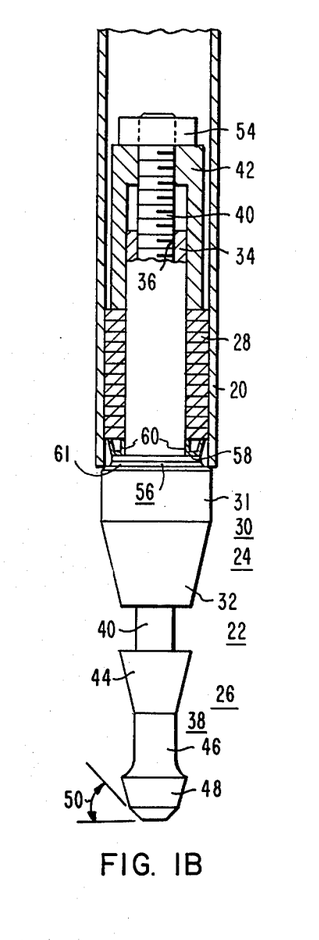

FIG. 1B illustrates tube guide-expander 22 held in engagement with tube 20 by radially expanded O-rings 28. Such engagement obtains from inserting the guide-expander 22 into tube 20 and suitably rotating drive element 38 relative to thrust portion 30. Such relative rotation provides the axial compression and radial expansion of O-rings 28 into engagement with tube 20's inner surface. Such engagement frictionally resists extraction of guide-expander 22 from tube 20 during its subsequent insertion through generally aligned tube support and tube sheet apertures. The radial expansion force of O-rings 28 is thus adjustable to provide and preserve the desired extent of frictional retention of guide-expander 22 within tube 20 during tube 20's insertion through the tube support and tube sheet apertures. Such compression induced expansion force should be less than the force needed to radially expand the tube since such tube expansion would inhibit the tube's insertion through the tube support and tube sheet apertures.

Figure 2:
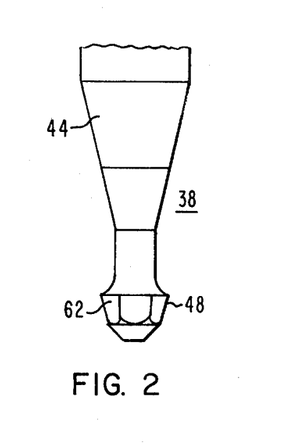
FIG. 2 is a partial sectional view of an alternate embodiment of the preferred guide-expander.

FIG. 2 illustrates an alternate embodiment of the guide-expander 22 disposed in a position analogous to that of FIG. 1A in which the guide-expander 22 has been inserted in tube 20, but is not in securing engagement therewith. The primary difference between the embodiments shown in FIG. 1A and FIG. 2 is that the embodiment of FIG. 2 has planes 62 formed on its tip portion 48 for engagement with a wrench. Such wrench engagement facilitates relatively rotating operationally exposed driving element 38 and tublarly housed ram 42 so as to axially compress and radially expand elastomeric O-rings 28.

FIG. 3 is a partial sectional view of a tube sheet 64 having openings 66 formed therethrough. Tube 20 and associated guide-expander 22 have been inserted through one of the openings 66 from the shell or secondary side 68 to the primary or tube side 70. Tube side 70 is normally at least partially enclosed so as to manifold fluids transmitted thereto and distribute them into the tubes communicating therewith. Such enclosure is normally obtained with a channel head structure (not shown). It is to be understood that tubes 20 may be U-shaped and thus require installation of tube guide-expanders 22 in both tube legs' open ends which must be simultaneously inserted through generally aligned tube support and tube sheet apertures. In the case of U-shaped tubes, the channel head will be partitioned into at least two manifolds—first and second tube leg communicating volumes. Inserting a U-tube and tube guide-expanders 22 installed therein through the tube sheet 64 will result in one of the tube's legs protruding a further and one a lesser distance beyond the primary side 70.

Further axial compression of O-rings 28 beyond their desired frictional retention extent causes further radial expansion thereof and eventual plastic radial expansion of the tube 20 into contact with opening 66. Such axial O-ring 28 compression may result from additional relative rotation of driving element 38 and ram element 42 or relative axial displacement of the first and second compression structures 24 and 26, respectively. Actuation of the guide-expander 22 is accomplished from the tube sheet's primary side 70 which may constitute, as in the case of a nuclear steam generator, a radioactive environment. As such, actuation, manipulation, and extraction of the guide-expander device 22 will preferably be attained through the use of a remotely controlled apparatus such as an actuator-extractor apparatus 72 illustrated in FIG. 4A and 4B. Relative axial displacement between the device's first and second compression structures was judged more desirable than relative rotation between ram 40 and driving element 38 primarily due to the simpler engagement technique required for axial displacement.

While the remaining illustrations show a single tube and attached guide-expander 22 associated with a single actuating-extractor apparatus, it is to be understood that for U-tube applications, one actuator-extractor apparatus 72 must be operable in each channel head manifold. In other words, for a heat exchanger having a single partition plate (not shown) in the channel head and having U-tubes whose respective legs are associated with the respective manifolds of the channel head, two such actuator-extractor apparatus 72 are required—one on either side of the partition plate. It is to be understood that apparatus 72 is positioned and supported by a tool support apparatus (hereafter referred to as an RΘ machine) as described in commonly-owned copending patent applications, Ser. No. 888,701 and Ser. No. 896,530, filed Apr. 14, 1978, each of which is herein incorporated by reference to the extent that the present invention requires a movable tool support-positioning mechanism. Thus, the number of RΘ machines, as disclosed in the aforementioned applications, is equal to the number of actuator-extractor apparatus 72 which are utilized. Apparatus 72 generally includes an axially displaceable outer sleeve structure 74, for selectively maintaining thrust portion 30 in abutting relationship with the tube 20, an axially displaceable inner sleeve structure 76, and a coupling mechanism for selectively linking driving element 38 to inner sleeve structure 76. Hydraulic cyinder 78 is connected with and provides axial displacement of inner sleeve structure 76.

Figure 4A:
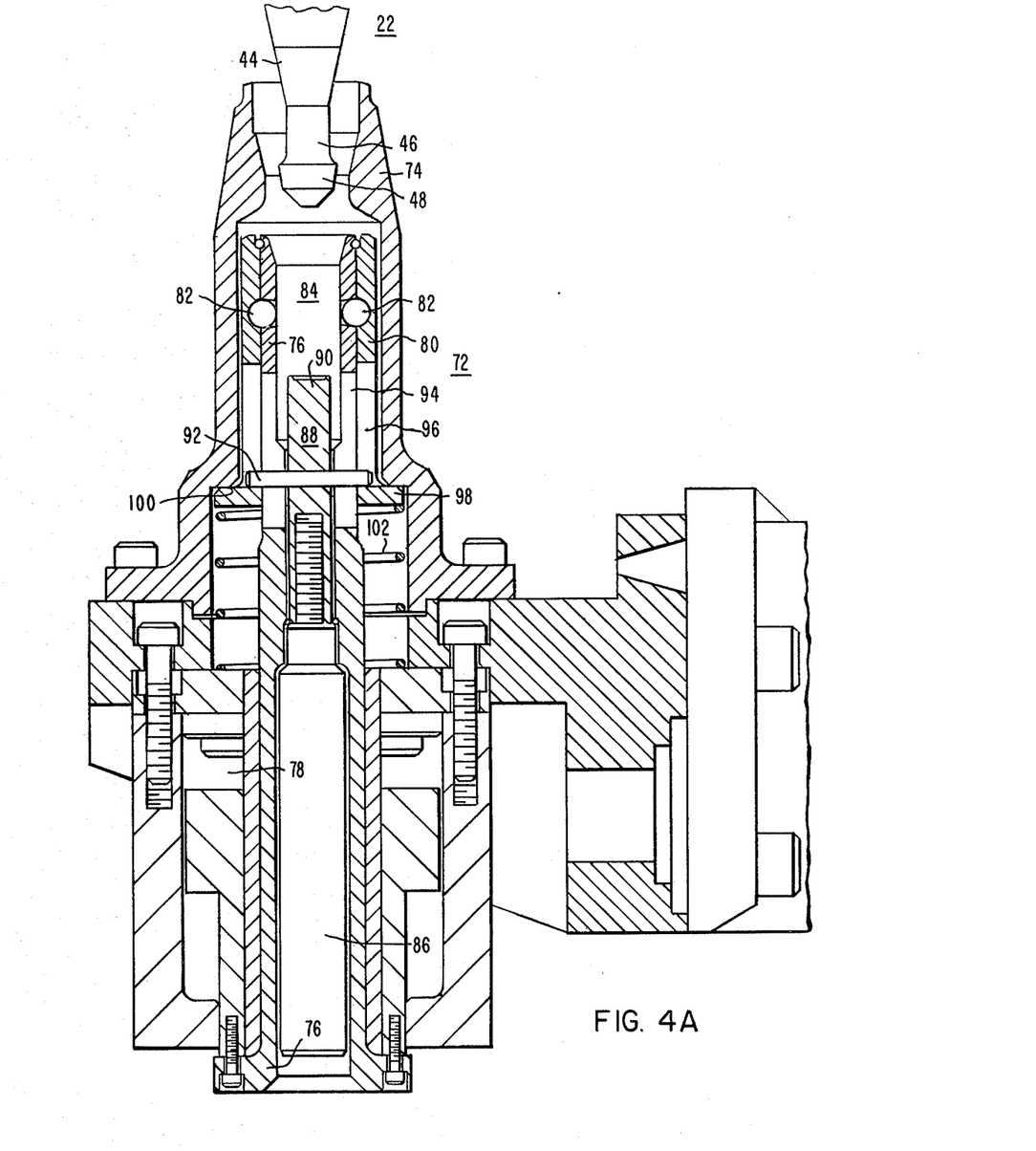
FIGS. 4A and 4B are partial sectional views of an actuating-extraction apparatus illustrating its operative approach configuration for the reception of the tube guide-expander.
Figure 4B:
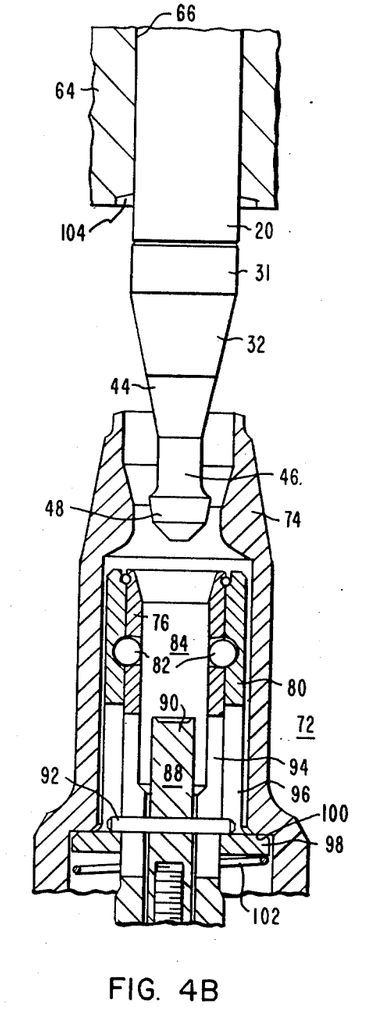

As shown in FIGS. 4A and 4B, apparatus 72 is initially positioned coaxially with guide-expander 22 by an RΘ machine (not shown) prior to being axially displaced toward tube sheet 64. The coupling mechanism includes a plurality (4 by example) of radial openings in inner sleeve structure 76, a equal number of radial openings in an intermediate sleeve structure 80 circumferentially disposed about in closely spaced radial relation with inner sleeve structure 76, and ball detents 82 radially displaceable in the openings. When the radial openings of inner and intermediate sleeve structures 76 and 80, respectively, are aligned, the ball detents 82 will move to a radially outer position as shown in FIGS. 4A and 4B. When situated in the illustrated, unobstructing position, balls 82 permit axial entry of device 22 into bore 84 of inner sleeve structure 76. During axial alignment of the inner and intermediate sleeve structure's radial openings, radial displacement of balls 82 to their unobstructing positions is ensured by providing the inner sleeve structure's radial openings with an axial expanse at the inner sleeve structure 76's outer periphery which is greater than the opening's axial expanse at inner sleeve structure 76's inner surface. The radial openings in intermediate sleeve structure 80 cooperate with inner sleeve structure 76's radial openings when aligned therewith to permit radial displacement of balls 82 such that the radially inner extent of balls 82 is preferably outside the bore 84 of inner sleeve structure 76. To provide axial alignment between the radial openings, axial displacing means such as air cylinder 86 is supported within and moves with inner sleeve structure 76. Air cylinder 86 includes piston structure 88 which is axially displaceable relative to inner sleeve structure 76. Piston structure 88 includes abutting element 90 and radial actuating pin 92 which extends through slots 94 and 96 respectively formed in the inner and intermediate sleeve structures. Axial alignment of the sleeve structures' radial openings is ensured by axially displacing piston structure 88 until alignment collar 98 attached to intermediate sleeve structure 80 engages shoulder 100 attached to outer sleeve structure 74. Pin 92 restrains axial movement of intermediate sleeve structure 80 against biasing spring 102 until collar 98 engages shoulder 100. Axial displacement of piston structure 88 toward guide-expander 22 beyond the position corresponding to engagement between collar 98 and shoulder 100 will be described later in conjunction with ejection of guide-expander 22 from apparatus 72.

Figure 5:
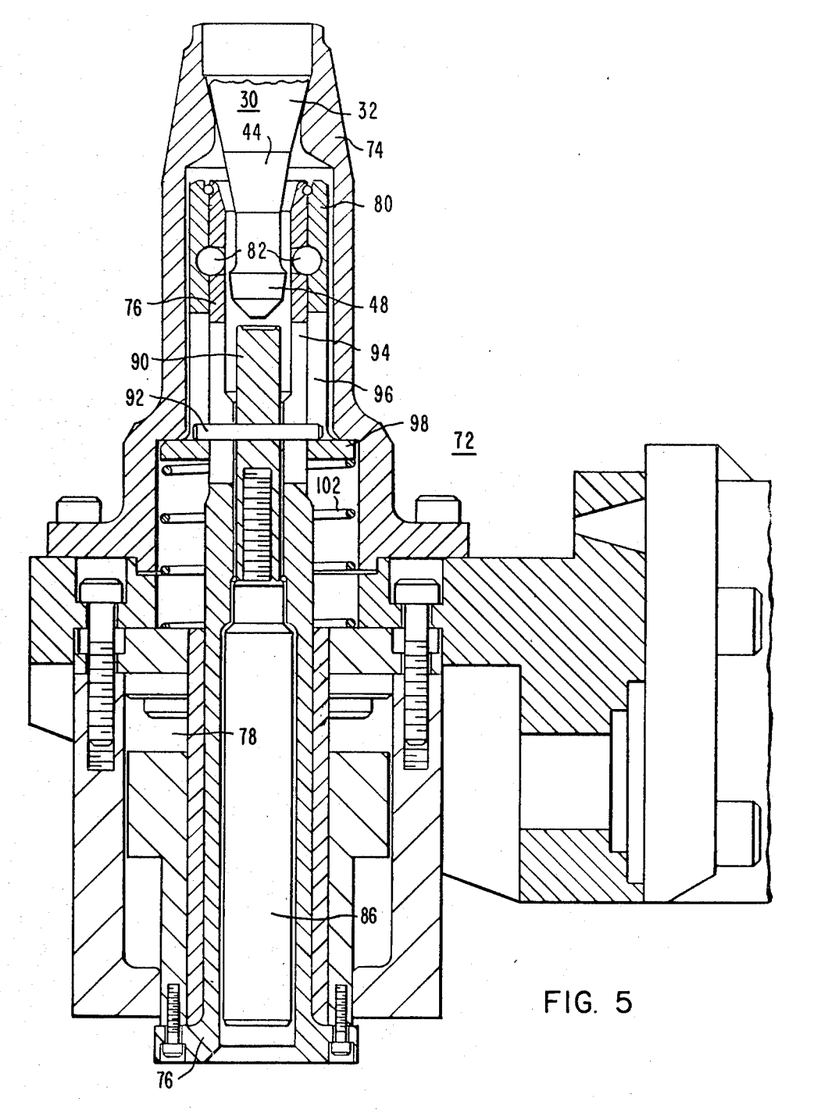
FIGS. 5, 6, 7A, 7B, 7C, 8A, 8B, 9, 10A, 10B, and 11 are partial sectional views of the guide-expander and actuating-extraction apparatus therefor sequentially illustrating the actuation, expansion, and extraction of the guide-expander.

FIG. 5 illustrates initial contact of outer sleeve structure 74 with the tapered component 32 of thrust portion 30. When inner sleeve structure 76 is in its illustrated furthest extended position and balls 82 are in their unobstructing, uncoupled configuration, outer sleeve structure 74 will engage guide expander 22's tapered component 32 shortly after tip portion 48 thereof passes into bore 84 axially beyond the aligned radial openings and their associated balls 82. Additional displacement of apparatus 72 toward tube sheet 64 by the RΘ machine provides simultaneous axial displacement of the guide-expander 22 and engaged tube 20. The desired configuration between tube 20 and tube sheet 64 is provided by terminating axial displacement of apparatus 72 upon its engagement with tube sheet 64.

Such engagement between apparatus 72 and tube sheet 64 preferably occurs when outer sleeve structure 74 axially abuts the boundary of counter bore 104 previously formed on primary side 70 of tube sheet 64 about each opening 66 therein. Counter bore 104 is shown by way of example and is not a required surface preparation for the tube 20 is in a known, abutting configuration with thrust utilization of disclosed apparatus 22 and 72.

Since the tube 20 is in a known, abutting configuration with thrust portion 30 of guide-expander 22, since guide-expander 22 is in a known, abutting configuration with actuator-extractor apparatus 72, since actuator-extractor apparatus 72 is in a known, abutting configuration with tube sheet 64, tube 20 can be considered to be in the desired configuration with tube sheet 64. Appropriate alteration of any or all the aforementioned parts and apparatus can be provided to obtain the desired tube-to-tube sheet configuration such as shortening outer sleeve structure 74 in the absence of counter bore 104.

Figure 6:
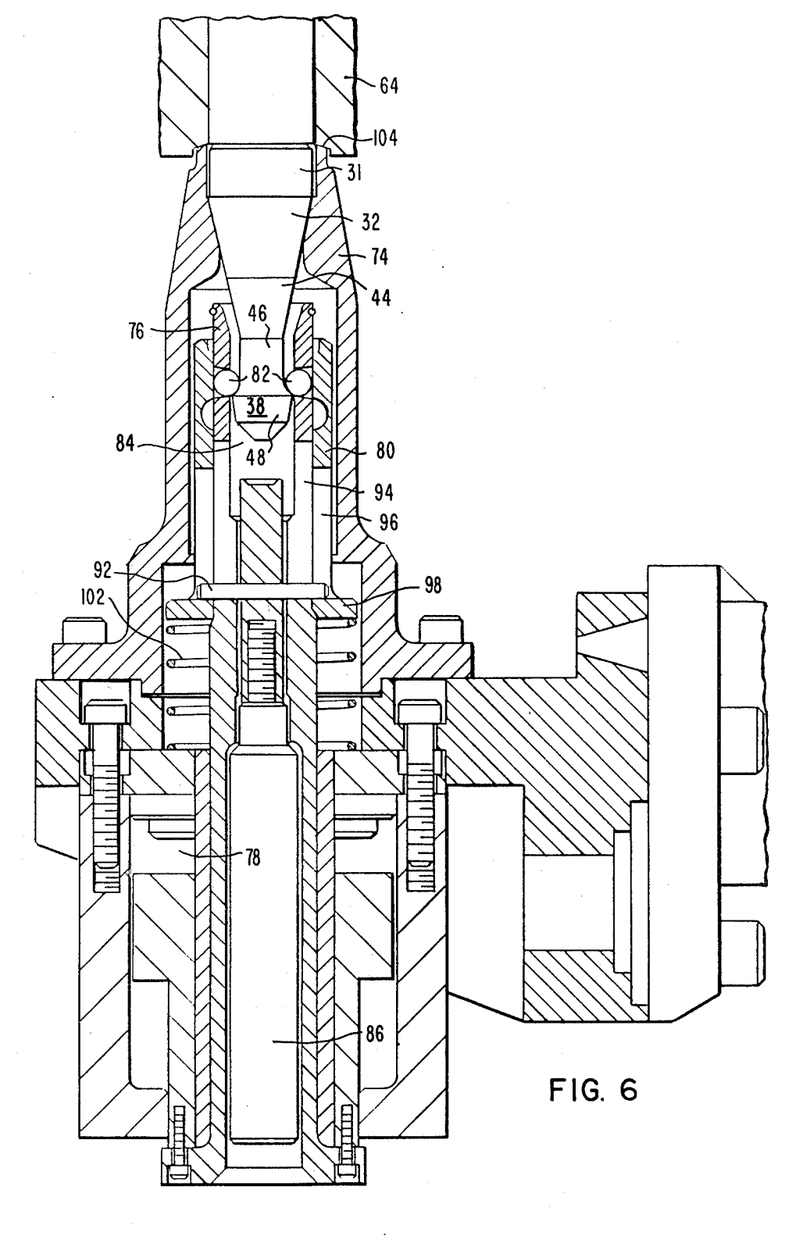

FIG. 6 illustrates apparatus 72 engaged with guide-expander 22 and tube sheet 64. Intermediate sleeve structure 80 has been axially retracted from tube sheet 64 causing radial displacement of balls 82 into their radially inner, obstructing relation with tip portion 48 of driving element 38 to prevent withdrawal thereof from bore 84. Intermediate sleeve structure 80 is retractable by axial displacement of radial actuating pin 92 which axially engages the lower end of slot 96 and thus disengages collar 98 from shoulder 100 and misaligns the radial openings in intermediate sleeve structure 80 from those of inner sleeve structure 76 against the biasing force of spring 102.

Figure 7A:
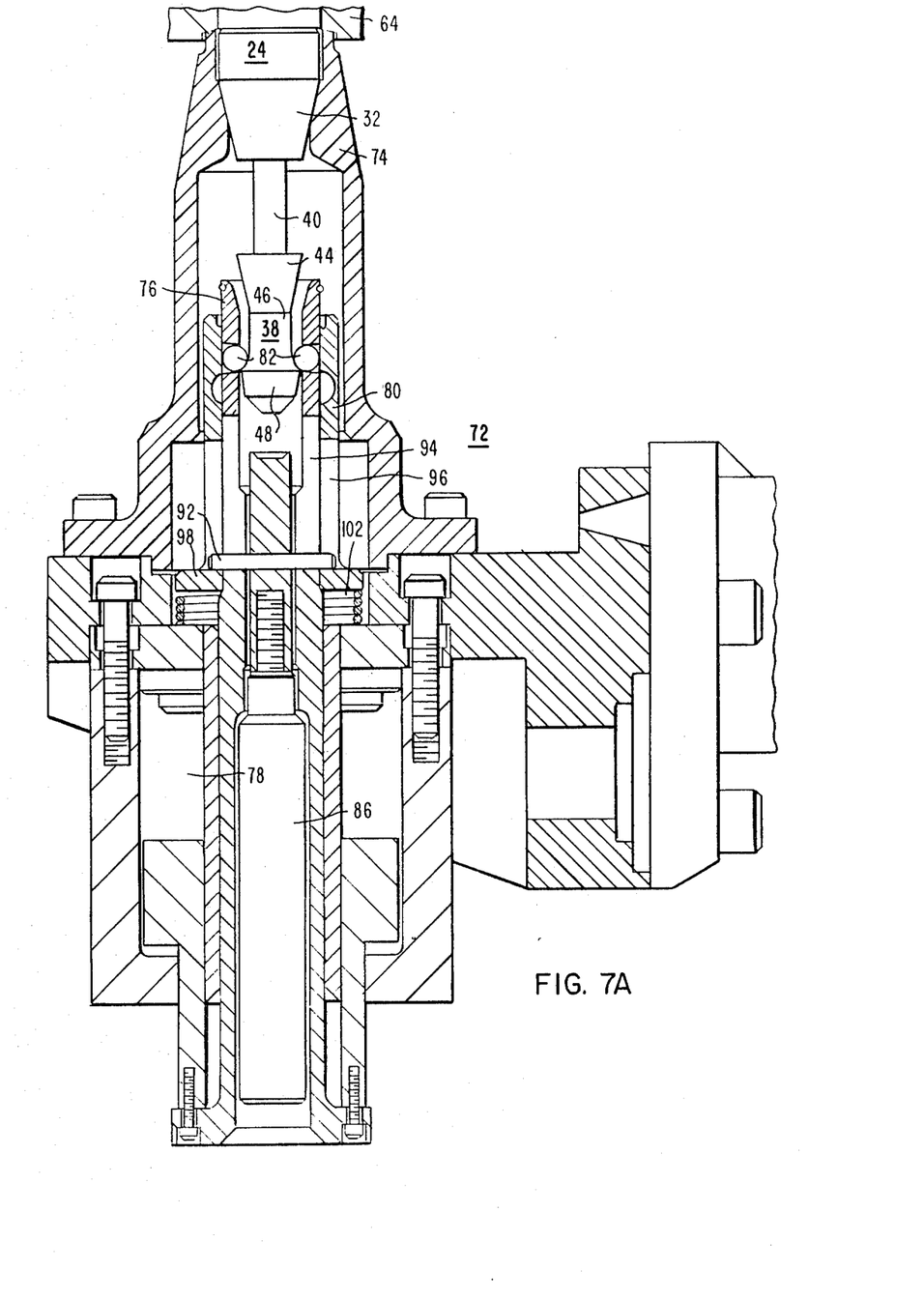
Figure 7B:
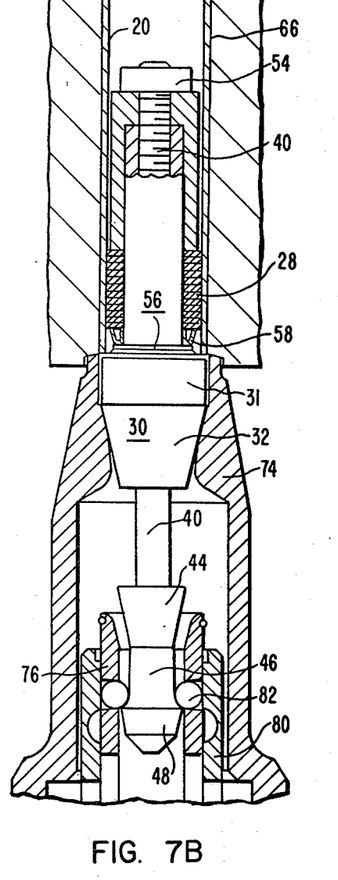
Figure 7C:
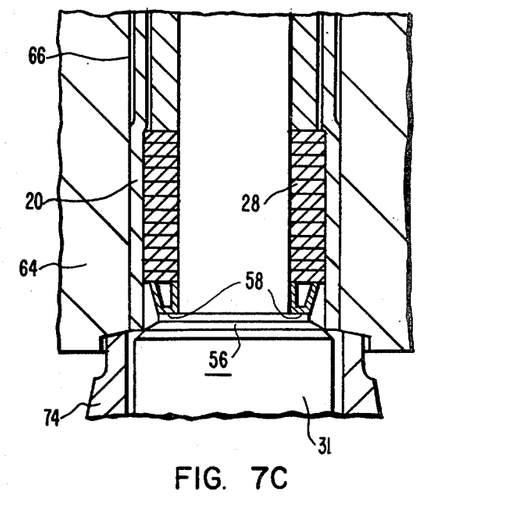

FIGS. 7A through 7C are partial sectional views of the actuator-extractor apparatus 72 in actuating engagement with guide-expander 22. FIG. 7A illustrates hydraulic cylinder 78 and connected inner sleeve structure 76 in their retracted positions in which driving element 38 and attached elongated element 40 are axially displaced relative to the first compression structure 24. When hydraulic cylinder 78 is retracted, balls 82 prevent withdrawal of driving element 38 from bore 84. Intermediate sleeve structure 80 is simultaneously axially retracted with the inner sleeve structure 76 by radial actuating pin(s) 92 which links the supported air cylinder 86 with intermediate sleeve structure 80. Spring 102 is axially compressed by the retraction of the intermediate sleeve structure 80 away from tube sheet 64. FIGS. 7B and 7C are partial sectional views of guide-expander 22's engagement with actuator-expander 72 and the radially expansible O-rings 28 in engagement with expanded tube 20, respectively. As can be seen in FIG. 7C, O-rings 28 have been axially compressed beyond their securing configuration of FIG. 1A and respond thereto by radially plastically expanding tube 20 against the wall of apperture 66.

Figure 8A:
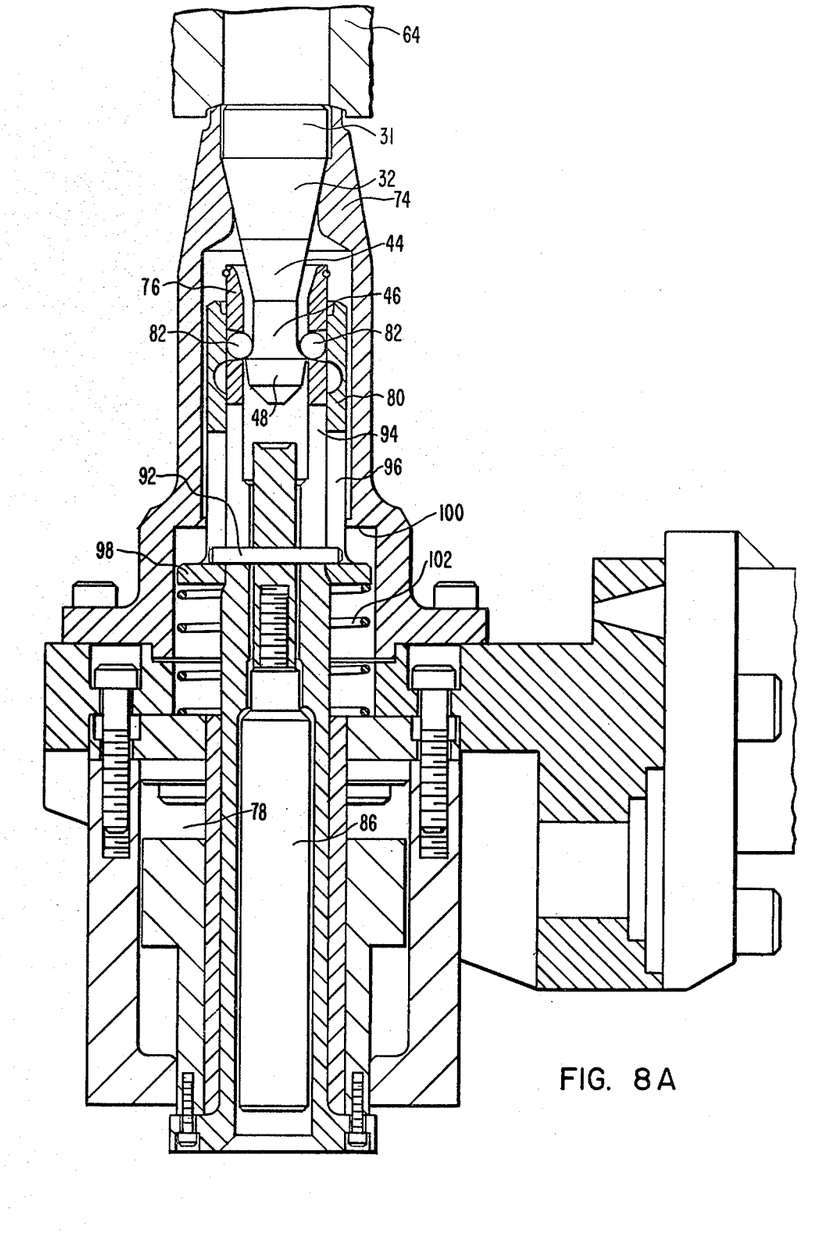
Figure 8B:
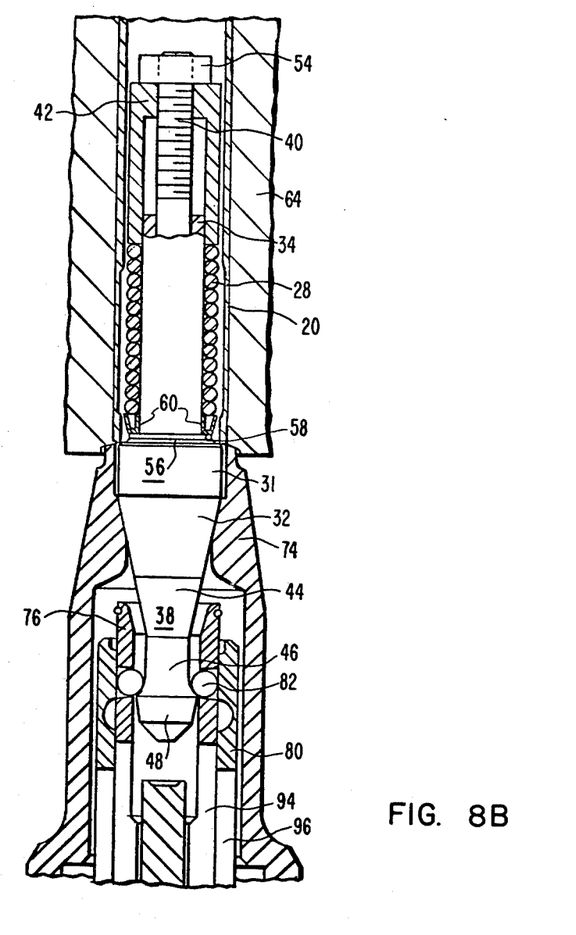
Figure 9:
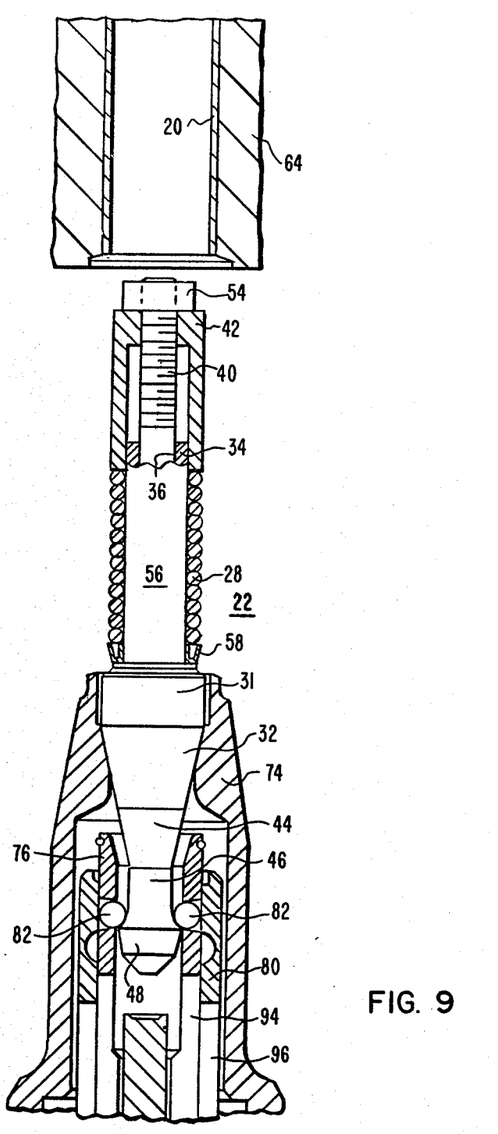

FIG. 8A is a partial sectional view of apparatus 22 and apparatus 72 illustrating a relative configuration therebetween identical to that of FIG. 6. FIG. 8A's configuration obtains from reversing the axial retraction of the inner and intermediate sleeve structures 76 and 80, respectively. All elements of apparatus 22 and 72 shown in FIG. 8A occupy the same relative configurations as do the elements illustrated in FIG. 6 with the only difference being tube 20's plastic expansion against aperture wall 66 as shown in FIG. 8B. FIG. 8B illustrates driving element 38 again in axially abutting relationship with tapered component 32 of guide-expander 22. As can be seen in FIG. 8B, O-rings 28 have again contracted to their radial securing size shown in FIGS. 1A and 3 through 6 and are now radially separated from the heretofore plastically expanded tube portion show in FIG. 7B and 7C. FIG. 9 is a partial sectional view of a portion of apparatus 72 and guide-expander 22 in a withdrawn position from expanded tube 20. Following the configuration of FIG. 8A and 8B, the entire apparatus 72 is retracted from tube sheet 64 by the supporting Rθ machine with balls 82 remaining radially disposed in their inner, obstructing position. Since outer sleve structure 74 is retracted with the inner sleeve structure 76, O-rings 28 are not radially expanded against the wall of tube 20 and the coupled guide-expander 22 is easily withdrawn from tube 20.

Figure 10A:
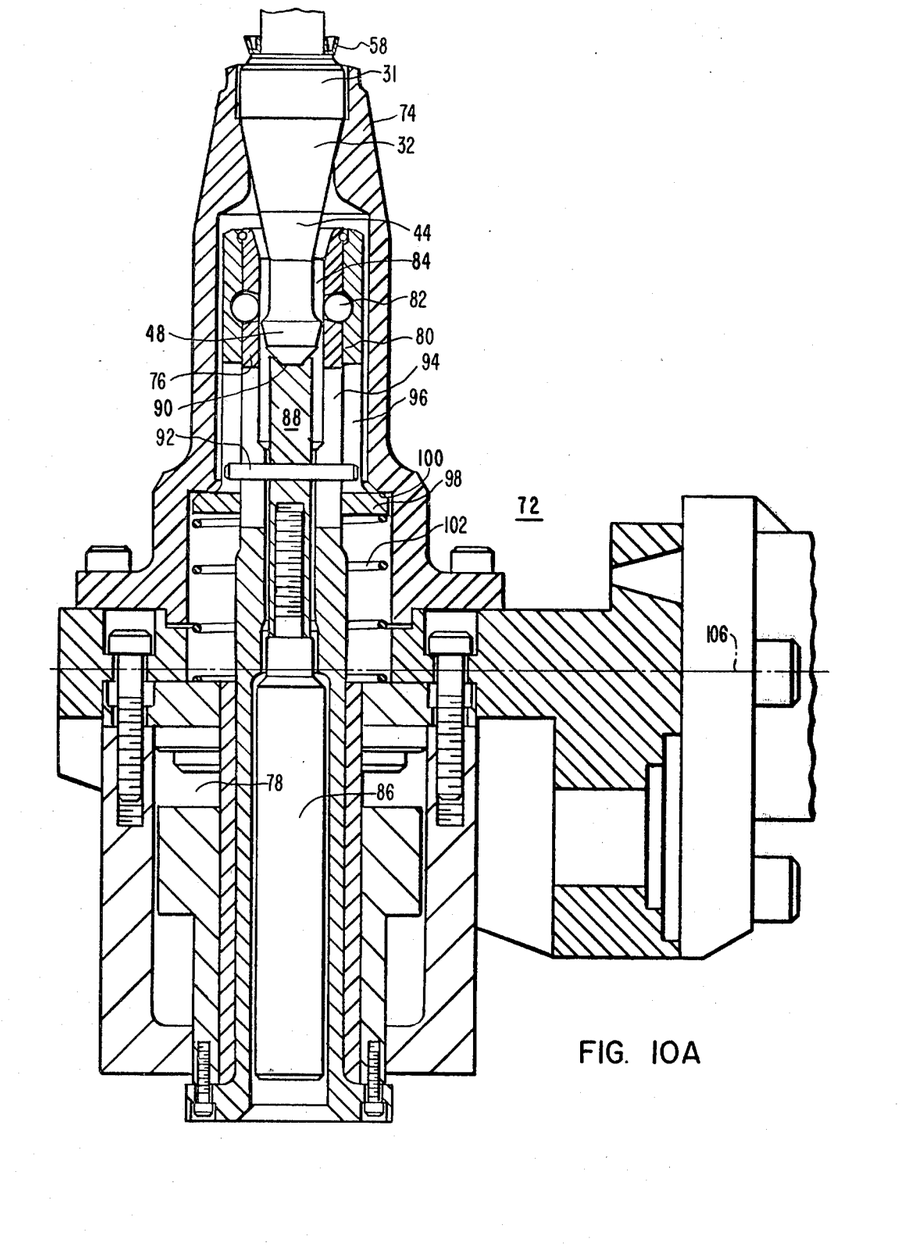
Figure 10B:
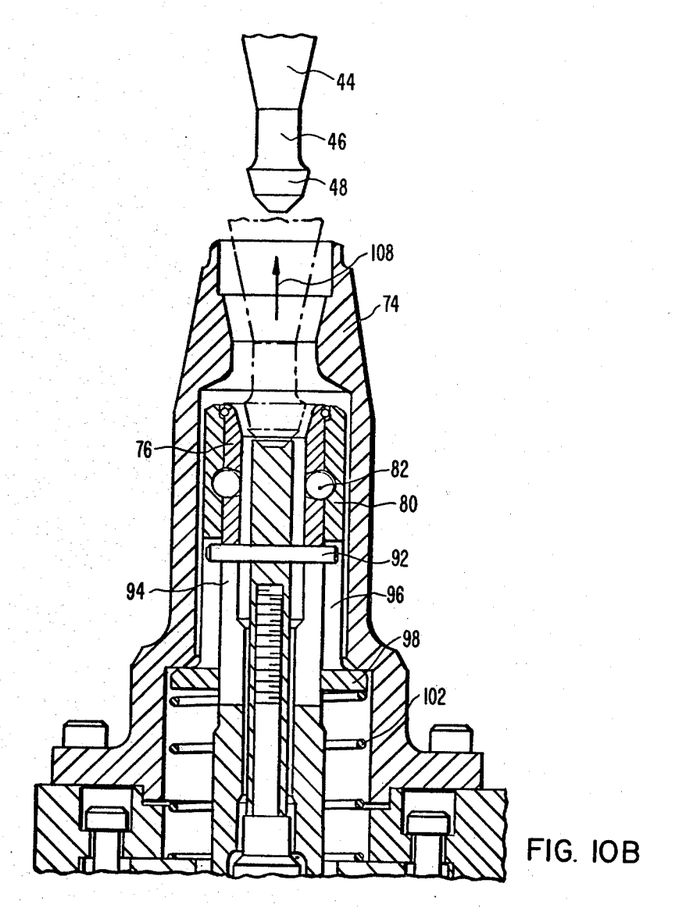
Figure 11:
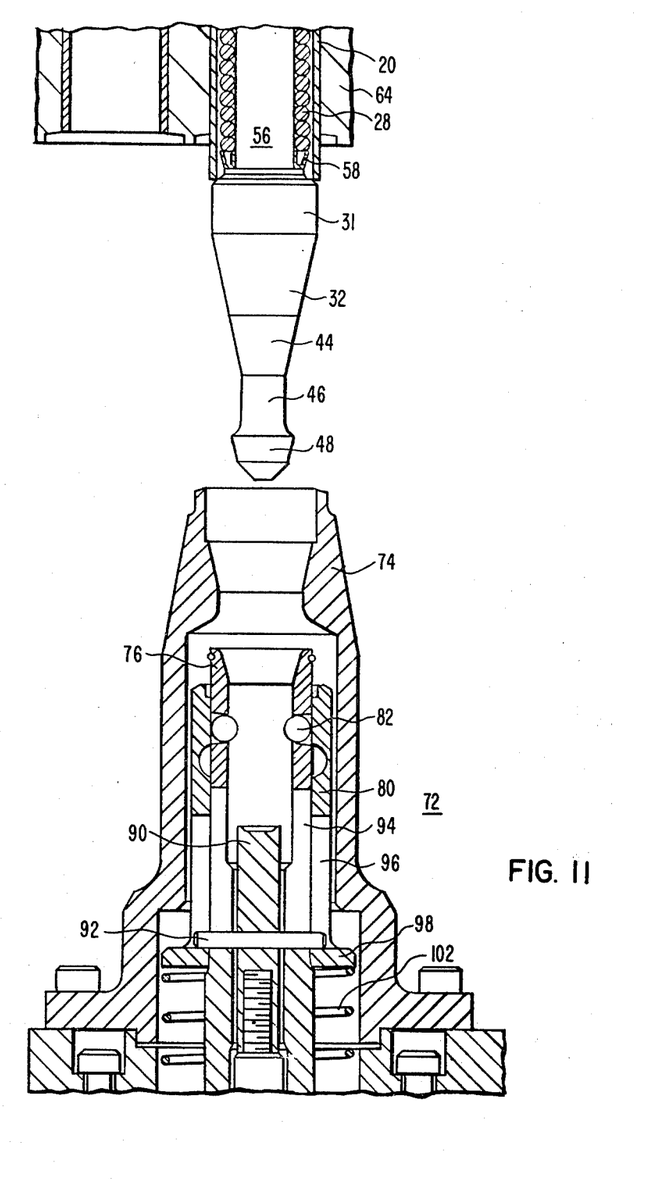

FIGS. 10A and 10B are partial sectional views illustrating the expulsion of guide-expander 22 from actuator-extractor apparatus 72. Upon axial retraction of apparatus 72 and 22 a suitable distance from the tube sheet 64 and other protruding guide-expander apparatus 22, apparatus 72 is preferably rotated at least 90° about axis 106 which is perpendicular to bore 84. Air cylinder 86 axially displaces piston structure 88 toward guide-expander 22. When collar 98 axially engages shoulder 100, the radial openings of the inner and intermediate sleeve structures 76 and 80, respectively, axially align and permit radial displacement of balls 82 to their unobstructing position. Further displacement of piston structure 88 sequentially results in axial abutment of abutting structure 90 with apparatus 22's tip portion 48 as illustrated in FIG. 10A and axial engagement between actuating pin 92 and the extreme boundary of slot 94. Engagement between pin 92 and the boundary of slot 94 ensures axial explusion of guide expander 22 in the direction shown by arrow 108 in FIG. 10B. Following such explusion, apparatus 72 is reversibly rotated to its extracting position about axis 106 and locked securely therein. The apparatus 72 is then indexed coaxially with another guide-expander 22 so as to assume the configuration shown in FIG. 11 in which collar 98 is engaged with shoulder 100 and balls 82 occupy their radially outer, unobstructing position in preparation for receiving the apparatus 22's driving portion 38 into bore 84.

When tubes 20 have U-shapes, two Rθ machines and associated actuator-extractor apparatus 72 are preferably disposed adjacent corresponding legs of the same U-tube. Only one leg of the U-tube should be swaged and properly configured relative to the tube sheet 64 at one time since the legs of a U-tube will not protrude through tube sheet 64 on the primary side 70 precisely the same distance. Since it is easier to push a tube leg 20 into proper configuration with tube sheet 64 from the primary side 70, the shorter protruding tube leg 20 of the U-tube is chosen after measurement thereof for proceeding with sequential steps as indicated at FIGS. 4A through 10B. Selection of the shorter protruding tube leg of the U-tube prevents that leg and attached guide-expander 22 from being withdrawn into its aperture 66 when the longer protruding tube leg is axially displaced into the desired configuration with tube sheet 64 as indicated in FIG. 6. After the shorter protruding tube leg has been properly configured and expanded, the longer protruding tube leg can be properly configured and expanded without fear of the aforementioned tube leg withdrawal. Although only one tube end has been described, it is to be understood that U-tubes have two ends which each appear the same as the described end. Subscribing to the aforementioned procedure for installing U-tubes necessitates sequential reference to the same Figures showing a single tube end.

It will now be apparent that a multi-duty tube guide-expander has been provided in which axial compression is utilized to produce radial expansion of a housing tube 20 into contact with the wall bounding a tube sheet aperture 66. Actuation of the guide-expander apparatus 22 and extraction thereof is facilitated by apparatus 72 which is engageable with the guide-expander 22 and can relatively axially displace at least two portions of the guide-expander 22 so as to radially expand it. Following actuation of the guide-expander apparatus 22, the extractor apparatus 22 extracts the guide-expander apparatus from the plastically expanded tube and expels it preparatory to its subsequent collection and removal. The actuator-extraction apparatus 72 can then be indexed to another guide-expander apparatus 22. While the guide-expander and actuator-extractor apparatus have been described in conjunction with vertically disposed tubes of a nuclear steam generator, it is to be understood that the aforementioned apparatus and method for utilizing the same equally facilitates tube installation in conventional, non-nuclear heat exchangers whose tubes are horizontally configured. RΘ machines as previously described provide the necessary support and manipulation of the actuator-extractor apparatus 72 and enable its indexation under suitable guide-expanders 22 protruding through tube sheet 64. Cooperative use of such apparatus permits multiple operations with a single tool, thus eliminating the need for tool changes, workmen interference, and/or exposure of the workmen to the environment surrounding the tube's primary side 70.

I claim:

1. An apparatus for guiding tubes having at least one open end into apertures through a tube sheet and expanding those tubes into contact with the tube sheet after properly positioning them in the apertures, said apparatus being releasably retained within the open tube end during the guiding and positioning thereof, said apparatus comprising:

a first compression structure having an opening therethrough, said first compression structure having a thrust portion which is radially smaller than the apertures and radially extends beyond the tube's inner surface, said thrust portion being disposable in axially abutting relationship with the tube's open end to restrain relative axial movement of the tube;

a second compression structure axially displaceable relative to said first compression structure and having ram, driving, and elongated elements respectively disposable inside the tube, protruding from the tube, and extending through said opening, said ram and driving elements being connected to opposite axial ends of said elongated element and radially extending beyond said opening, said driving element including a tip portion having a guide facillitating, inwardly converging wall in a direction away from the tube;

expansion means axially disposed between said first and second compression structures and operationally disposable inside the tube end for radially engaging the tube's inner surface in response to axial compression thereof; and means for maintaining a predetermined extent of compression on and radial enlargment of said expansion means during tube guidance through the tube sheet aperture so as to provide releasable frictional retention thereof in the tube.

2. The apparatus of claim 1, said first compression structure further comprising:

a sleeve portion disposed adjacent the thrust portion, said sleeve portion being operationally insertable in the tube, the radially inner surface of the sleeve bounding the opening.

3. The apparatus of claim 1, said first compression structure further comprising:

a positioning surface disposed axially adjacent said thrust portion for ensuring concentricity between the opening and the tube, said positioning surface tapering outwardly in an axial direction away from the tube to a radial distance less than the tube's inner radius.

4. The apparatus of claim 1, said first compression structure further comprising:

seal means for preventing flow of said expansion means between said thrust portion and said tube.

5. The apparatus of claim 1, said expansion means comprising:

a plurality of elastomeric O-rings disposed about said elongated element.

6. The apparatus of claim 1, said compression maintaining means comprising:

means for preserving selective axial displacements between said enlongated element and at least one of said connected elements.

7. The apparatus of claim 6, said axial displacement preserving means comprising:

engageable threads on said elongated element and at least one of said connected elements, said elements being relatively axially displaceable when relatively rotated, said relative axial displacement providing axial compression of said expansion means for retaining the apparatus in the tube.

8. The apparatus of claim 7, further comprising:

a stopping structure for preventing threaded disengagement between said elongated element and relatively displaceable, connected element.

9. The apparatus of claim 1 wherein said tip portion's converging wall constitutes a frustoconical surface.

10. The apparatus of claim 1 wherein said tip portion's converging wall has a plurality of flat planes suitable for engagement with a wrench.

* * * * *